United States Patent
Wei (10) Patent No.: US 9,264,265 B1
(45) Date of Patent: Feb. 16, 2016

(54) SYSTEM AND METHOD OF GENERATING WHITE NOISE FOR USE IN GRAPHICS AND IMAGE PROCESSING

(75) Inventor: Li-Yi Wei, Redwood City, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1818 days.

(21) Appl. No.: 10/956,954

(22) Filed: Sep. 30, 2004

(51) Int. Cl.
*H04L 12/743* (2013.01)
*H04L 25/03* (2006.01)

(52) U.S. Cl.
CPC ..... *H04L 25/03299* (2013.01); *H04L 25/03993* (2013.01)

(58) Field of Classification Search
CPC ............... H04L 25/03299; H04L 25/03993
USPC ........ 380/205, 37, 38, 42, 201, 200; 713/176, 713/181, 189; 345/418, 426, 419, 587, 626, 345/582; 717/143
See application file for complete search history.

(56) References Cited

U.S. PATENT DOCUMENTS

| | | | |
|---|---|---|---|
| 6,549,210 B1 * | 4/2003 | Van Hook et al. | 345/561 |
| 6,628,786 B1 * | 9/2003 | Dole | 380/44 |
| 6,747,660 B1 * | 6/2004 | Olano et al. | 345/582 |
| 7,015,909 B1 * | 3/2006 | Morgan, III et al. | 345/426 |
| 7,133,041 B2 * | 11/2006 | Kaufman et al. | 345/419 |
| 7,203,310 B2 * | 4/2007 | England et al. | 380/200 |
| 2002/0147918 A1 * | 10/2002 | Osthoff et al. | 713/193 |
| 2003/0067474 A1 * | 4/2003 | Fenney et al. | 345/582 |
| 2004/0046765 A1 * | 3/2004 | Lefebvre et al. | 345/582 |

FOREIGN PATENT DOCUMENTS

GB 2343599 * 6/1998 ............. G06T 15/00

* cited by examiner

*Primary Examiner* — Ellen Tran (57) ABSTRACT

A method of generating white noise for use in graphic and image processing, in accordance with one embodiment of the present invention, includes receiving one or more hash inputs. The hash inputs may be one or more primitive coordinates, one or more texel addresses, a base image, a device identifier, or a user password. The one or more hash inputs are evaluated utilizing a cryptographic hash function. The output of the cryptographic hash function generates one or more white noise samples. The white noise samples may be utilized as texel data. The white noise samples may also be utilized for encrypting images.

20 Claims, 5 Drawing Sheets

B) HASH INPUT   C) WHITE NOISE

3B) WOOD GRAIN FROM 3A

3C) L = 4, p = 0.3

3D) MARBLE VEIN FROM 3C

5A) INPUT IMAGE    5B) ENCRYPTED IMAGE

SYSTEM AND METHOD OF GENERATING WHITE NOISE FOR USE IN GRAPHICS AND IMAGE PROCESSING

BACKGROUND OF THE INVENTION

Three-dimensional graphics processing is utilized in a number of applications, from electronic games, and movies to computer aided design (CAD). Conventionally, three-dimensional graphics processing includes a multi-step rendering process of transitioning from a database representation of three-dimensional objects to a two-dimensional projection of the object into a display space. The process generally includes setting up a polygon model (e.g., a plurality of primitives) of objects, applying linear transformation to each primitive, culling back facing primitives, clipping the primitives against a view volume, rasterizing the primitives to a pixel coordinate set, shading/lighting the individual pixels using interpolated or incremental shading techniques, and the like. Typically, graphics processors are organized in a pipeline architecture, where each stage is dedicated to performing specific functions. A benefit of the pipeline architecture is that it permits fast, high quality rendering of even complex scenes.

A random number generator may be utilized for graphics and image processing applications. For example, the random number generator may be utilized to generate noise samples for use in texturing processes. The random number generator may be implemented by a thermal noise generator (e.g., thermal resistor) or a software implemented sequential random number generator. A thermal resistor provides a hardware implementable random number generator having a high degree of entropy. However, the thermal resistor does not provide a repeatable random number sequence, which is important for both hardware/software debugging and maintaining rendering consistency in animations.

Software implemented sequential random number generators (e.g., $X_N = aX_{N-1} + b$) are implemented by the central processor unit (e.g., CPU) and provide a random number after a relatively long sequence. The sequential number generation processes is repeatable, but is not readily implementable in hardware. It is appreciated that the input may be determined from the output (e.g., solve for $X_{N-1}$ given $X_N$). It is also appreciated that random number generators implemented in software are sequential and present a performance bottleneck for parallel computations in pipeline architectures. In addition, typical sequential random number generators (e.g., linear congruential regression equation) are pseudo-random and can significantly bias the resultant statistics.

SUMMARY OF THE INVENTION

Accordingly, embodiments of the present invention are directed toward a system and method of generating white noise for use in graphic and image processing. In one embodiment, a graphics processor includes a shader module, a texture module and a parallel hashing module. The texture module and the parallel hashing module are coupled to the shader module. The texture module provides a texture mapping function to the shader module. The parallel hashing module generates white noise as a function of a key. The white noise may be utilized as texel data for use in the graphics processor. The white noise may also be utilized for encrypting images generated by the graphics processor.

In another embodiment, a method of generating white noise for use in graphic and image processing includes receiving one or more hashing inputs. The hashing inputs may be, for instance, one or more primitive coordinates, one or more texel addresses, a base image, or a device identifier. The one or more hashing inputs may be evaluated utilizing a cryptographic hash function. The output of the cryptographic hash function generates one or more white noise samples. The white noise samples may be utilized as texel data. The white noise samples may also be utilized for encrypting images.

Embodiments of the present invention advantageously generate white noise for use in graphics and image processing. The system and method for generating white noise advantageously generates a random number having a high degree of entropy in a single step. Accordingly, the embodiments of the present invention advantageously reduce processing latency in graphics and image processing without consuming memory.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
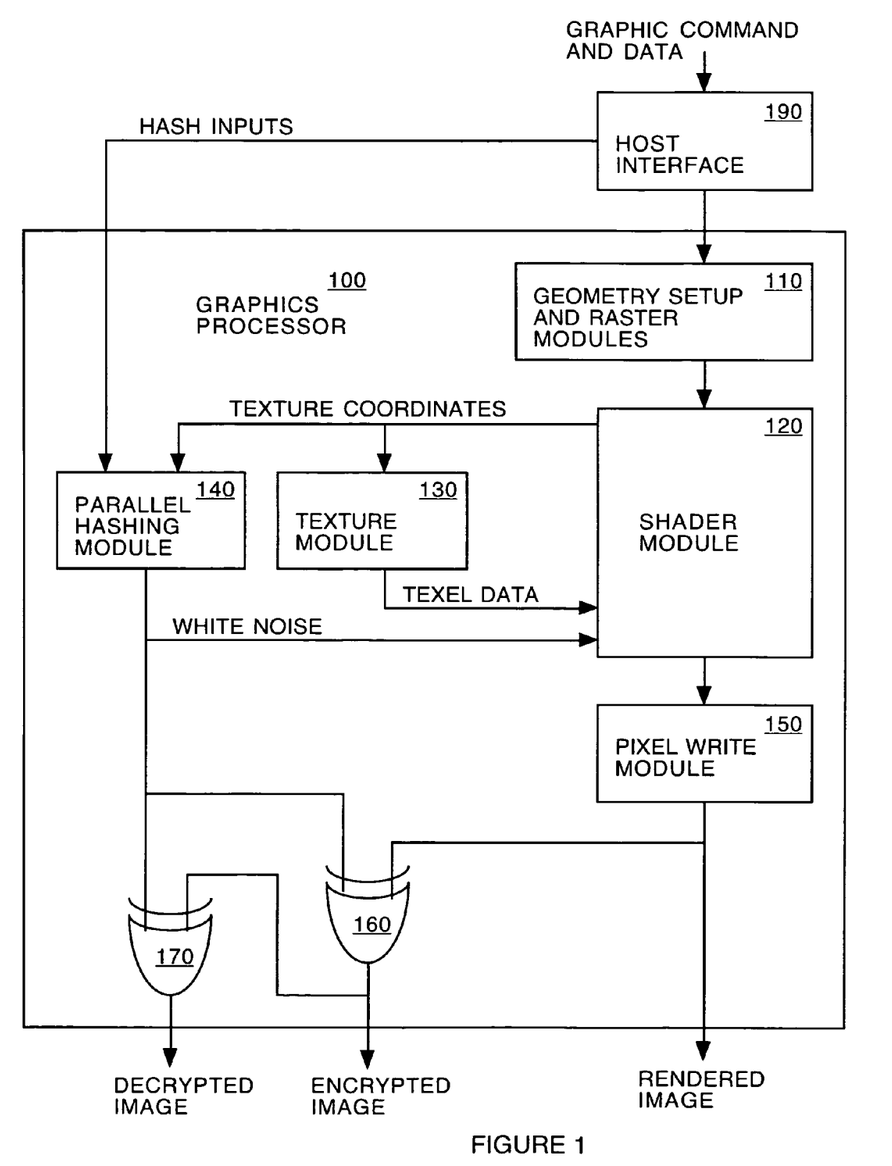
FIG. 1 shows a block diagram of a graphics processor, in accordance with one embodiment of the present invention.

Referring to FIG. 1, a block diagram of a graphics processor 100, in accordance with one embodiment of the present invention, is shown. As depicted in FIG. 1, the graphics processor 100 may include geometry setup and raster modules 110, a shader module 120, a texture module 130, a parallel hashing module 140 and a pixel write module 150. The shader module 120 may be coupled to the geometry setup and modules 110. The texture module 130 and the parallel hashing module 140 may be coupled in parallel with each other to the shader module 120. The pixel write module 150 may be coupled to the shader module. It is appreciated that the graphics processor 100 may also include one or more other modules well-known in the art, such as a fog module, alpha test module, depth test module, alpha blend module, etc., coupled to the geometry setup and raster modules 110, shader module 120, texture module 130, parallel hashing module 140 and/or pixel write module 150.

The geometry setup and raster modules 110 receives one or more graphics commands and data from a host interface 190. The shader module 120 may receive one or more transformed primitive parameters from the geometry setup and raster modules 110. The shader 120 may implement one or more position, color, texture, reflectivity, filter, blend and the like functions on the primitive parameters. The pixel write module 150 may output pixel data produced by the shader module 120. In one implementation, the pixel write module 150 stores the pixel data as a rendered image in a memory (e.g., computer-readable medium), such as a frame buffer.

The shader module 120 utilizes the texture module 130 to provide texture mapping (e.g., level of detail, texel address, etc.). The texture module 130 receives one or more texture coordinates from the shader module 120 and returns the corresponding texel data from one or more appropriate textures stored in memory (e.g., mipmap). Alternatively, the shader 120 may utilize the parallel hashing module 140 for texturing functions.

The parallel hashing module 140 may receive one or more hash inputs. A hash input may be a plurality of primitive parameters, one or more texel addresses, a base image, a device identifier, a graphics processor device identifier, a user password or the like. The parallel hashing module 140 evaluates the one or more hash inputs utilizing a cryptographic hash function. The cryptographic hash function converts an arbitrary bit stream, into a unique fixed-length bit stream of random numbers (e.g., white noise) having a high degree of entropy. In one embodiment, a plurality of texture coordinates are hashed to produce corresponding white noise samples that are returned as procedural texel data to the shader module 120. In another embodiment, the texture coordinates are hashed to produce corresponding white noise samples. The white noise samples may then be utilized to produce other types of noise (e.g., pink noise, brown noise, fractal noise, etc.). The other types of noise may then be utilized as texel data by the shader module 120.

Alternatively or in addition, the parallel hashing module 140 may be utilized to generate white noise for encrypting images. In one embodiment, a hash input is hashed to produce white noise. The samples of white noise may be combined with pixel data (e.g., rendered image) to generate encrypted pixel data (e.g., encrypted image). In one embodiment, the graphics processor 100 further includes a first XOR gate 160. The parallel hashing module 140 receives one or more hash inputs at an input and outputs a white noise. The first XOR gate 160 receives an image (e.g., rendered image) at a first input and the white noise at a second input. The first XOR gate 160 outputs an encrypted image at an output. In one implementation, the encrypted image may be stored in a computer-readable medium, such as a frame buffer, a graphics memory, a unified memory or the like. It is appreciated that the XOR'ing function may alternatively be implemented by a shader instruction.

It is appreciated that the image may be decoded from the encrypted image by combining the encrypted image with the same white noise. In one embodiment, the graphics processor 100 further includes a second XOR gate 170. The second XOR gate 170 receives the encrypted image at a first input and the same white noise at a second input. The second XOR gate 170 outputs a decrypted image at an output.

In one implementation, the hash input to the parallel hashing module 140 may be a device identifier (e.g., graphics processor device identifier), user password or the like. Accordingly, by combining a rendered image with white noise generated by hashing a device identifier it may then be possible to uniquely determine the specific device (e.g., computer) or the individual that generated the image.

It is also appreciated that the white noise generated by the parallel hashing module 140 may also be utilized by other functions performed by the shader module 120, raster module, fog module, alpha test module, depth test module, alpha blend module and/or the like.

The cryptographic hash function is a one-way function. It is generally infeasible to reverse the process to determine the original input. It is also infeasible to find two different inputs that produce the same output. Accordingly, given an arbitrary input, any particular bit of the output should be zero substantially half the time. In addition, any two output samples should be substantially uncorrelated no matter how similar the inputs are.

The cryptographic hashing function may be a message digest algorithm (e.g., MD1, MD2, MD3, MD4, MD5), a security hash standard (e.g., SHA, SHS) or the like. In one implementation, an MD5 algorithm receives an arbitrary message as an input and produces a 128-bit message digest as an output. At initialization, the MD5 algorithm pads the input to the nearest multiple of 512 bits. The algorithm computes a 128-bit digest from each 512-bit chunk of the input through 64 stages of bit scrambling operations, including AND, OR, XOR, negation, addition, and circular shifting Boolean functions. The individual digests may then be summed as a final message digest. It is appreciated that the MD5 algorithm may thus be utilized to generate 32-bit white noise samples. More specifically, four 32-bit texel coordinates may be packed as a single message and the resulting message digest may be split into four 32-bit white-noise samples.

The MD5 algorithm is performed utilizing integer and bit-wise operations. The MD5 algorithm is designed to be quite fast for 32-bit processors. For example, 0.73 million 512-bit messages may be hashed per second on a PC having a 1.5 MHz Intel Pentium CPU. The pipeline nature of the MD5 algorithm also makes it suitable for implementing in hardware on a graphics processor, such as that in FIG. 1.

It is appreciated that the parallel hashing module 140 does not suffer from the memory latency or cache coherency issues that the conventional texture module 130 incurs. For example, the parallel hashing module 140 utilizing the MD5 algorithm may achieve a maximum throughput of one 128-bit sample per clock, provided sufficient requests are grouped together. This translates to 350 million 128-bit samples per second for a 350 MHz graphics processor. A texture module 130, having similar length and data dependency, generates approximately 17.4 million 32-bit samples per second on a 350 MHz graphics processor, such as the GeForce FX 5600 from NVIDIA of Santa Clara, Calif.

It is appreciated that the parallel hashing module 140 may be implemented in hardware or software utilizing a plurality of Boolean operators. In one implementation, a MD5 based parallel hashing module 140 may typically be implemented by 64 stages comprising AND, OR, XOR, negation, addition and circular shifting circuits. The MD5 based parallel hashing module 140 may also typically be implemented utilizing a 64×32 bit table constructed from the sine function. The hardware costs of the parallel hashing module 140 may be reduced by simplifying the MD5 algorithm. In one implementation, latency of the parallel hashing module 140 may be reduced by reducing the stage of circuits to 16 stages by executing 4 adjacent stages in parallel. Alternatively or in addition, the computer-readable medium for storing sine table entries may be reduced by keeping only the 8 most significant bits of each sine table entry, and replicating each 8 bit entry into 32 bits at run time. Accordingly, simplifying the hardware implementation of the cryptographic hashing function may advantageously reduce processing latency and consumption of system memory.

Figure 2A:
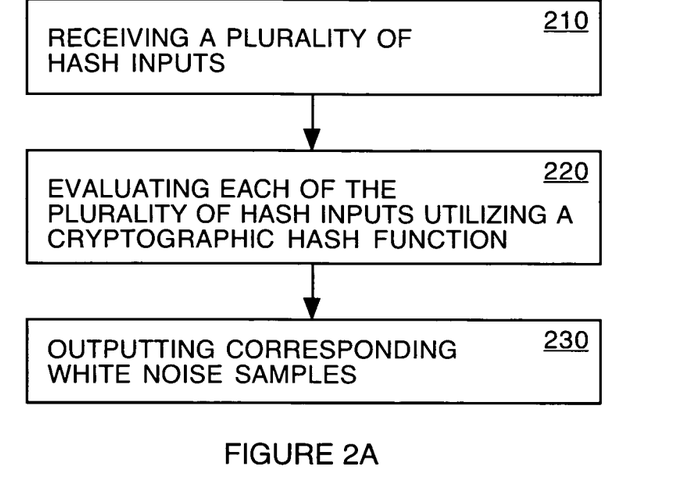
FIG. 2A shows a flow diagram of a method of generating white noise for use in graphics and image processing, in accordance with one embodiment of the present invention.

Referring now to FIG. 2A, a flow diagram of a method of generating white noise for use in graphics and image processing, in accordance with one embodiment of the present invention, is shown. As depicted in FIG. 2A, the method begins with receipt of one or more hash inputs, at step 210. Each hash input may be one or more primitive coordinates, one or more texel addresses, base image, a device identifier, a user password and/or the like.

At step 220, the hash input(s) are evaluated utilizing a cryptographic hash function. Each sample of the hash inputs may be evaluated independently and in parallel. The cryptographic hash function may be a message digest algorithm (e.g., MD2, MD3, MD4, MD5), a security hash standard (SHS, SHA, SHS-1, SHA-1, SHA-224, SHA-256, SHA-384, SHA-512) or the like. Such cryptographic hash functions generate random numbers having a high degree of entropy in a very short sequence.

Figure 2B:
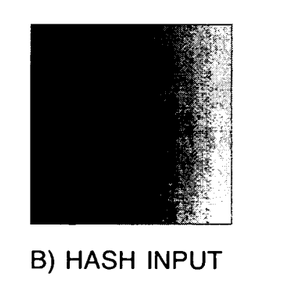
FIGS. 2B and 2C show an exemplary hash input and white noise generated according to the method shown in FIG. 2A.
Figure 2C:
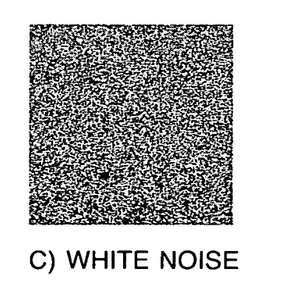

At step 230, the white noise samples generated by the cryptographic hashing function are then output. Referring now to FIGS. 2B and 2C, an exemplary hash input and white noise generated according to the method shown in FIG. 2A, is shown. As depicted in FIG. 2B, the exemplary hash input may be a 256×256×3 image. The exemplary white noise generated by hashing each input pixel independently is depicted in FIG. 2C. The total computation time is approximately 60 milliseconds on a PC having a 1.5 GHz Intel Pentium processor.

The white noise samples, generated according to the method shown in FIG. 2A, may be output as procedural texturing (e.g., mathematically generated texel values) for use by the shader module, raster module, fog module, alpha test module, depth test module, alpha blend module and/or the like. The white noise samples may also be output for further processing by the hashing module 140, shader module 120, raster module, fog module, alpha test module, depth test module, alpha blend module and/or the like. In one implementation, the white noise may be further processed to generate pink noise, brown noise, fractal noise or the like, in accordance with any well-known prior art functions. Such other noise may be used to generate patterns, such as wood, marble, etc., without the use of a texture stored in memory (e.g., mipmap).

Figures 3A, 3B:
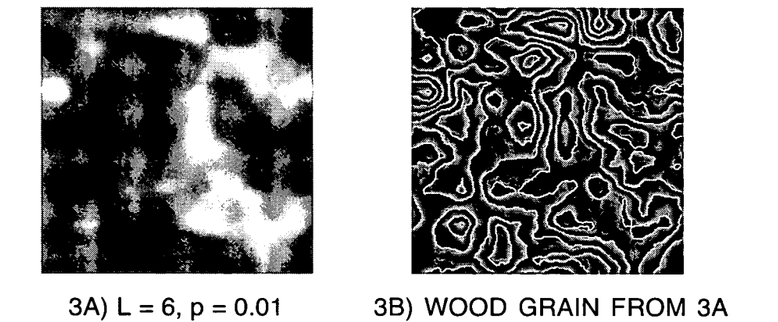
FIGS. 3A, 3B, 3C and 3D show exemplary noises and textures generated from such noises, in accordance with one embodiment of the present invention.
Figures 3C, 3D:
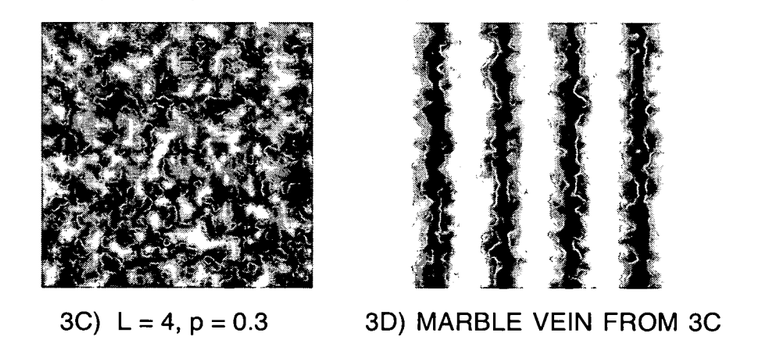

Referring now to FIGS. 3A, 3B, 3C and 3D, exemplary noises and textures generated from such noises, in accordance with one embodiment of the present invention, are shown. The textures may be generated as a function of white noise from the parallel hashing module of 140 of FIG. 1 in accordance with the process described with reference to FIG. 2A. For example, fractal noises, generated from white noise, with different levels L and persistence p are depicted in FIGS. 3A and 3C. FIGS. 3B and 3D depict corresponding textures generated from the fractal noise samples shown in FIGS. 3A and 3C. Assuming the fractal noises of FIGS. 3A and 3C are normalized in the range [0 1], the wood grain texture in FIG. 3B is generated by fractions($8 \times N_f$) and the marble vein in FIG. 3D is generated by $|\cos(4\pi \times x + N_f)|$.

Figure 4:
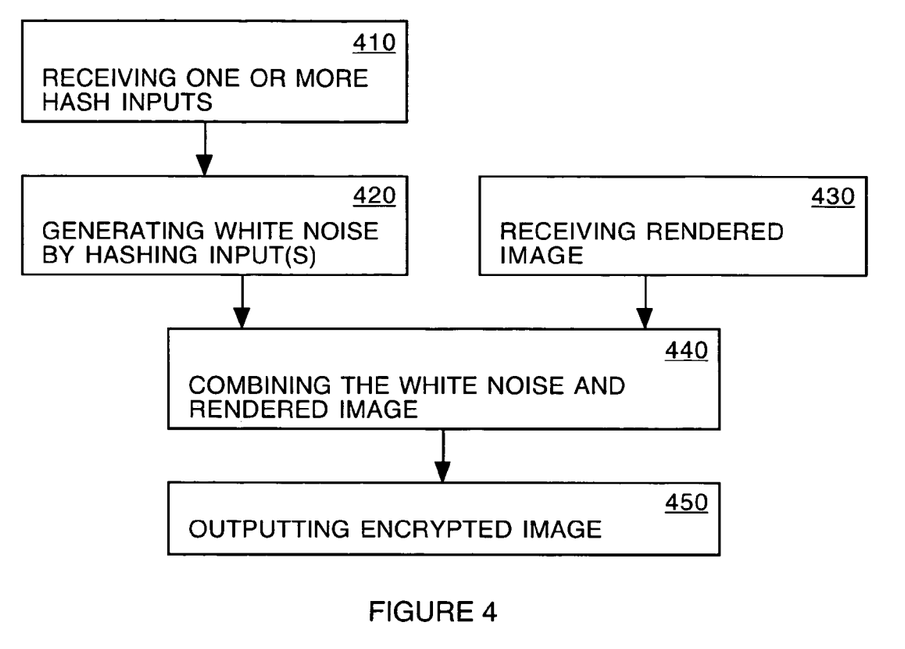
FIG. 4 shows a flow diagram of a method of image encryption, in accordance with one embodiment of the present invention.

Referring now to FIG. 4, a flow diagram of a method of image encryption, in accordance with one embodiment of the present invention, is shown. As depicted in FIG. 4, the method of image encryption begins with receiving one or more hash inputs, at step 410. Each hash input may be a device identifier, a user password, a base image (e.g., simple ramp image), one or more primitive coordinates, one or more texel addresses and/or the like.

At step 420, the one or more hash inputs are evaluated utilizing a cryptographic hash function to generate a plurality of white noise samples. Each sample of the hash input may be evaluated independently and in parallel. The cryptographic hash function may be a message digest algorithm (e.g., MD2, MD3, MD4, MD5), a security hash standard (SHS, SHA, SHS-1, SHA-1, SHA-224, SHA-256, SHA-384, SHA-512) or the like. Such cryptographic hash functions generate random numbers having a high degree of entropy. Furthermore, an arbitrary large number of white noise samples may be produced from a small hash input (e.g., graphics processor device identifier).

At step 430, a rendered image is received. In one implementation, the rendered image may be a plurality of pixel values destined for storage in a frame buffer or similar computer-readable medium. The generated white noise is bit-wise combined with the received rendered image to effectively encrypt the rendered image, at step 440. In one embodiment, the pixel values are combined with the white noise samples utilizing a bit-wise Boolean XOR function. At 450, the encrypted image generated by XOR'ing the rendered image and the white noise is output.

It is appreciated that the encrypted image may be decrypted by combining the encrypted image with the same white noise. More specifically, the pixel values of the encrypted image are combined with the same white noise samples utilizing the bit-wise Boolean XOR function to generate the decrypted image.

Figure 5A:
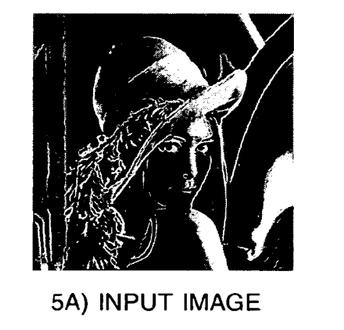
FIGS. 5A and 5B show an exemplary input image and encrypted image, in accordance with one embodiment of the present invention.
Figure 5B:
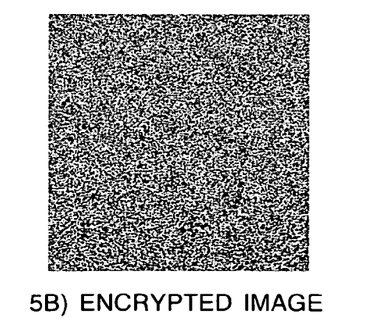

Referring now to FIGS. 5A and 5B, an exemplary input image and encrypted image, in accordance with one embodiment of the present invention, is shown. The encrypted image depicted in FIG. 5B is generated by bit-wise XOR'ing the input image depicted in FIG. 5A with white noise generated utilizing a cryptographic hashing function. It is appreciated that the encrypted image may be decrypted by XOR'ing the encrypted image with the same white noise.

Figure 6A:
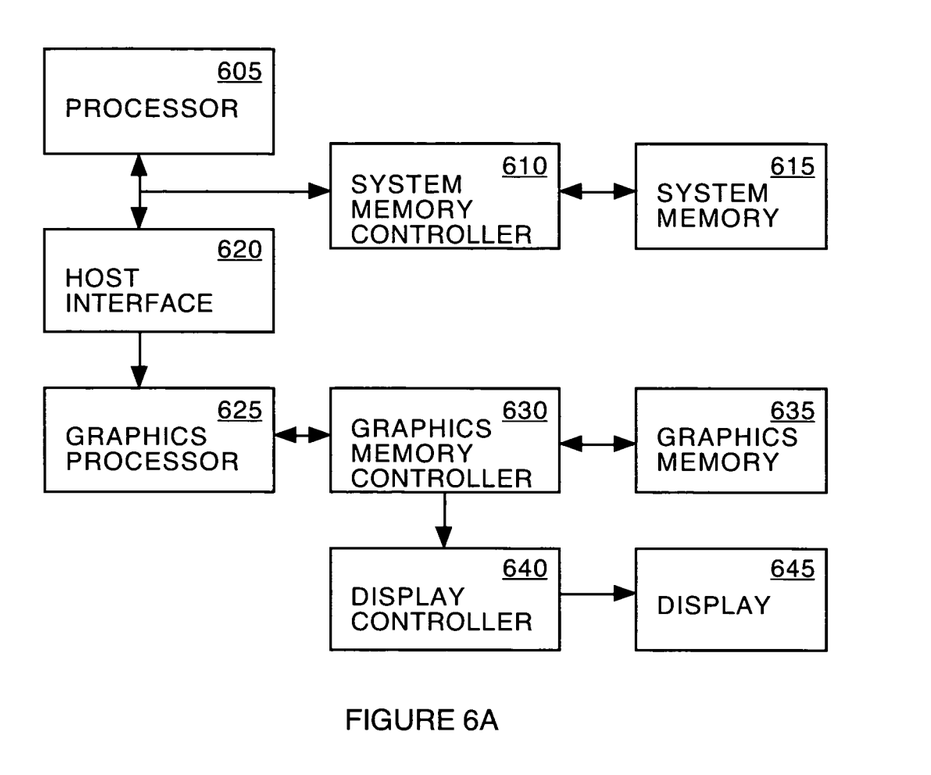
FIGS. 6A and 6B show block diagrams of exemplary computing device for implementing embodiments of the present invention.
Figure 6B:
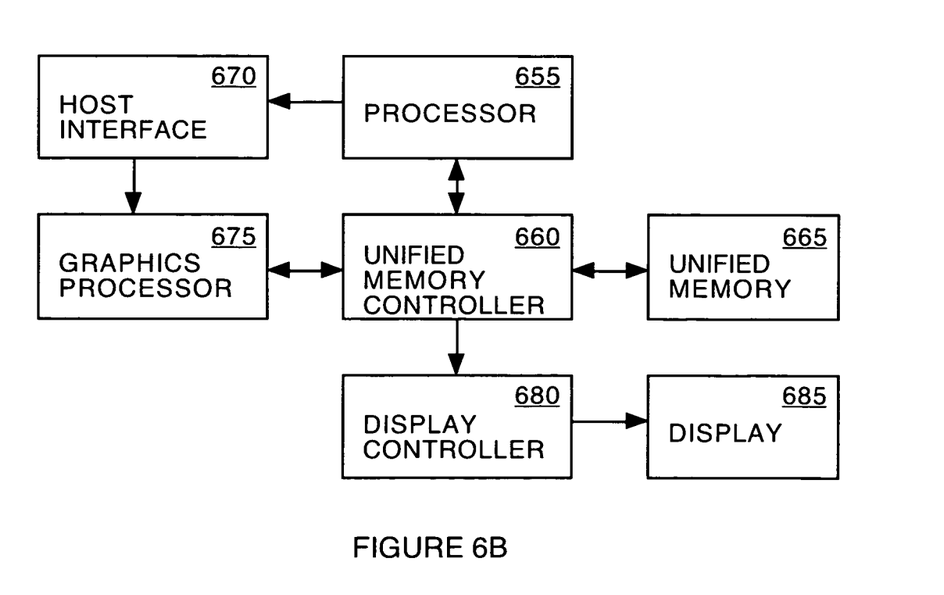

Referring now to FIGS. 6A and 6B, block diagrams of exemplary computing devices for implementing embodiments of the present invention, are shown. The computing devices may be a cellular telephone, PDA or other portable wireless appliance, navigation system (e.g., map enabled GPS), palm-sized computer, tablet computer, game console, personal entertainment center, media center PC, computer based simulator, desktop computer, laptop computer, or the like. The computing device architectures provide the execution platform for implementing certain functionality of embodiments of the present invention. As depicted in FIG. 6A, a first computing device may include a processor 605, a system memory controller 610, a system memory 615, a host interface 620, a graphics processor 625, a graphics memory controller 630, a graphics memory 635, a display controller 640 and a display 645. The processor 605 may be communicatively coupled to the system memory 615 through the system memory controller 610. The processor 605 may also be communicatively coupled to the graphics processor 625 through the host interface 620. The graphics processor 625 may be communicatively coupled to the graphics memory 635 through the graphics memory controller 630. The graphics memory controller 630 may also communicatively couple the display controller 640 to the graphics memory 635. The display 645 may be communicatively coupled to the display controller 640.

As depicted in FIG. 6B, a second computing device may include a processor 655, a host interface 670, a graphics processor 675, a unified memory controller 660, a unified memory 665, a display controller 680 and a display 685. The processor 655 may be communicatively coupled to the unified memory 665 through the unified memory controller 660. The processor 655 may also be communicatively coupled to the graphics processor 675 through the host interface 670. The graphic processor 675 may be communicatively coupled to the unified memory 665 through the unified memory controller 660. The unified memory controller 660 may also communicatively couple the display controller 680 to the unified memory 665. The display 685 may be communicatively coupled to the display controller 680.

The processor 605, 655 provides one or more applications by operating on instructions (e.g., computer executable code) and information (e.g., data) stored in memory 615, 665 (e.g., computer-readable medium). The memory controller 610, 660 controls the flow of such information and instructions between the processor 605, 655 and memory 615, 665. Images to be output on the display 645, 685 may be off-loaded to the graphics processor 625, 675 by the processor 605, 655. The images are off-loaded by transferring geometric primitive parameters, draw commands and instructions for controlling the operation of the graphics processor 625, 675. The primitive parameters, draw commands and instructions are transferred from the processor 605, 655 to the graphics processor 625, 675 under control of the host interface 620, 670. In one implementation, a widely implemented graphics application programming interface, such as the OpenGL-ES™ graphics language, Direct3D™, or the like, is utilized for the software interface between the graphics processor 625, 675 and the applications provided by the processor 605, 655.

The graphics processor 625, 675 generates a color value for each pixel of the display 645, 685 in response to the received primitives, draw commands and instructions. The graphics processor 625, 675 includes a parallel hashing module coupled to a shader module, as more fully described above with reference to FIG. 1. The parallel hashing module generates white noise as a function of one or more hash inputs, in accordance with the method more fully described above with reference to FIG. 2. The one or more hash inputs may be primitive coordinates, texel addresses, a device identifier, user password, base image and/or the like. The white noise may be utilized as texel values by the shader module of the graphics processor 625, 675. The white noise may also be further processed by the graphics processor 625, 675 to generate other types of noise, such as pink noise, brown noise, fractal noise and/or the like. The white noise may also be combined with pixel data to generate encrypted images and decrypt them, as more fully described above with reference to FIGS. 1 and 4.

Accordingly, embodiments of the present invention advantageously generate white noise for use in graphics and imaging processes. The white noise may advantageously be utilized for generating texel data by a graphics processor without consuming texture memory. The white noise may also advantageously be utilized to provide image encryption and image decryption. Embodiments of the present invention advantageously implement a parallel hashing module in hardware for generating the white noise. The parallel hashing module advantageously generates a random number having a high degree of entropy in a single step. Accordingly, the parallel hashing module advantageously reduces processing latency in the graphics processor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   receiving a plurality of samples of one or more hash inputs selected from the group consisting of a primitive coordinate, and a texel address; and
   generating a plurality of white noise samples from a one-way cryptographic hashing said hash input, wherein each sample of the hash input is evaluated independent and in parallel to each generate one or more white noise samples.

2. The method of claim 1, wherein said white noise sample is utilized as a texel value.

3. The method of claim 1, further comprising generating a noise sample selected from the group consisting of a pink noise, brown noise and fractal noise as a function of said white noise sample.

4. The method of claim 3, wherein said noise sample is utilized as a texel value.

5. The method of claim 1, further comprising combining said white noise sample with a pixel value.

6. The method of claim 5, wherein said combining said white noise sample with said pixel value comprises XOR-ing said pixel value with said white noise sample.

7. A computer readable-medium containing a plurality of instructions which when executed cause a computing device to implement a method of generating white noise comprising:
   receiving a plurality of samples of one or more hash inputs selected from the group consisting of a plurality of primitive coordinates, and a plurality of texel addresses; and
   evaluating each of said one or more hash inputs utilizing a one-way cryptographic hash function to generate white noise samples, wherein each sample of the hash input is evaluated independently and in parallel to each generate one or more white noise samples.

8. The computer readable-medium according to claim 7, wherein each of said one or more hash inputs are evaluated independently.

9. The computer readable-medium according to claim 8, wherein each of said one or more hash inputs are evaluated in parallel.

10. The computer readable-medium according to claim 7, wherein said cryptographic hash function comprises a message digest algorithm.

11. The computer readable-medium according to claim 7, wherein said cryptographic hash function comprises a security hash algorithm.

12. The computer-readable medium according to claim 7, wherein said white noise samples are utilized as a plurality of texel values.

13. The computer-readable medium according to claim 7, further comprising generating an encrypted image as a function of said white noise samples and an original image.

14. The computer-readable medium according to claim 13, wherein said generating said encrypted image comprises bit-wise XOR-ing pixel values of said rendered image with said white noise samples.

15. A graphics processor comprising:

a shader module;

a texture module, coupled to said shader module, for texture mapping; and a parallel one-way hashing module, coupled to said shader module, for generating white noise as a function of one or more hash inputs selected from the group consisting of a primitive coordinate, and a texel address, wherein each sample of the hash input is evaluated independently to generate one or more white noise samples.

16. The graphics processor of claim 15, further comprising:

a pixel write module coupled to said shader module for outputting a rendered image;

a first XOR gate coupled to said parallel hashing module and said pixel write module for generating an encrypted image as a bit-wise function of said white noise and said rendered image.

17. The graphics processor of claim 16, further comprising a second XOR gate, coupled to said first XOR gate and said parallel hashing module, for generating a decrypted image as a bit-wise function of said white noise and said encrypted image.

18. The graphics processor of claim 15, wherein said white noise is returned to said shader module as a texel value.

19. The graphics processor of claim 16, wherein said parallel hashing module comprises a plurality of hardware implemented Boolean operators arranged in a plurality of stages.

20. The method of claim 1, further comprising:

receiving one or more additional hash inputs selected from the group consisting of a device identifier and a user password; and generating the plurality of white noise samples also as a function of cryptographic hashing said one or more additional hash inputs.

\* \* \* \* \*